United States Patent
Presby et al.

(10) Patent No.: US 6,856,734 B1
(45) Date of Patent: Feb. 15, 2005

(54) WAVEGUIDE STRUCTURE USING POLYMER MATERIAL AND METHOD

(75) Inventors: Herman M. Presby, Highland Park, NJ (US); Dietrich Marcuse, Lincroft, NJ (US)

(73) Assignee: TriQuint Technology Holding Co., Hillsboro, OR (US)

( * ) Notice: Subject to any disclaimer, the term of this patent is extended or adjusted under 35 U.S.C. 154(b) by 0 days.

(21) Appl. No.: 09/134,121

(22) Filed: Aug. 14, 1998

(51) Int. Cl.[7] .............................. G02B 6/26; G02B 6/00
(52) U.S. Cl. ........................ 385/42; 358/123; 358/145
(58) Field of Search ........................... 385/3, 8, 16, 42, 385/123–130

(56) References Cited

U.S. PATENT DOCUMENTS

| | | | |
|---|---|---|---|
| 4,685,766 A | | 8/1987 | Nishimura et al. ......... 385/125 |
| 4,756,599 A | * | 7/1988 | Maeda et al. ............... 385/123 |
| 4,798,445 A | * | 1/1989 | Yamamoto et al. ......... 385/123 |
| 4,812,011 A | * | 3/1989 | Tatsukami et al. .......... 385/123 |
| 4,923,278 A | * | 5/1990 | Kashyap et al. ............ 385/123 |
| 4,979,796 A | * | 12/1990 | Cardarelli et al. .......... 385/123 |
| 5,007,706 A | * | 4/1991 | Parker et al. ............... 385/123 |
| 5,402,514 A | * | 3/1995 | Booth et al. ................ 385/145 |

FOREIGN PATENT DOCUMENTS

| | | |
|---|---|---|
| EP | 0 444 582 A2 | 9/1991 |
| EP | 0 642 052 A1 | 3/1995 |
| JP | 59075228 | 4/1984 |

OTHER PUBLICATIONS

Temperature Dependence of Index of Refraction of Polymeric Waveguides, Moshrefzadeh et al., Journal of Lighwave Technology, Apr. 10, (1992) No. 4, pp. 420–425.
Behavior of the Refractive Index And of the Coefficient of Thermal Expansion of Silicone with Temperature, J. Dugas et al., Applied Optics, Nov. 1, 1986, vol. 25, No. 21, pp. 3807.3808.

* cited by examiner

*Primary Examiner*—Thong Nguyen
(74) *Attorney, Agent, or Firm*—Thomas, Kayden, Horstemeyer & Risley, LLP

(57) ABSTRACT

Disclosed is the use of a polymer material in an optical waveguide structure. The polymer material may be used in either the cladding or the core material of an optical waveguide. The use of polymer material as such is advantageous in that the index of refraction of polymer material varies significantly with changing temperature. The polymer material is subjected to a heating mechanism and/or a cooling mechanism to manipulate the index of refraction as desired.

9 Claims, 4 Drawing Sheets

$x_1 < RI_{165} < x_2$

WAVEGUIDE STRUCTURE USING POLYMER MATERIAL AND METHOD

FIELD OF THE INVENTION

The present invention relates to the field of optical waveguides and, more particularly, to the materials used to construct optical waveguides.

BACKGROUND OF THE INVENTION

Current communications networks throughout the world have embraced the use of optical fiber waveguide technology to provide a conduit of transmission components for voice, video, and data signals. Optical networks offer far greater bandwidth and reliability than do conventional electronic networks. As a consequence, current research efforts have been directed to expanding the capabilities of optical waveguide technology at reduced cost to aid in the acceleration of the conversion of the present electrical communications networks to optical communications networks.

These optical communications networks are comprised of many different components. These include optical fiber cable, switches, attenuators, couplers, and many more such devices. Typically, these devices are comprised of a core surrounded by a cladding material. Both the materials used for the core and the cladding include silica or doped silica as well as many other similar materials. These materials are employed because they have a desirable index of refraction and as well as other properties which facilitate their use.

Even though current materials used in constructing the core and the cladding have many beneficial properties, it can be desirable to manipulate the properties of such materials to create an effect on the propagation of laser radiation through the waveguide. Consequently, there is a need for core and cladding materials with properties that can be manipulated effectively to create a desired effect on the propagation of laser radiation.

SUMMARY OF THE INVENTION

The present invention entails the use of a polymer material in an optical waveguide structure. The use of polymer material as such is advantageous in that the index of refraction of polymer material varies significantly with changing temperature. The polymer material may be used in either the cladding or the core material of an optical waveguide.

The present invention may also be viewed as an optical waveguide system in which the cladding or the core of a waveguide includes the polymer material. The polymer material is in close proximity to or adjacent to a thermo-electric heater which, in turn, is electrically coupled to a voltage source. According to the waveguide system, the index of refraction of the polymer material may be manipulated by applying heat to the polymer material from the thermo-electric heater controlled by the voltage source. In addition, the thermo-electric heater may be replaced by a laser source which focuses laser radiation on the polymer material, causing it to heat as desired. Finally, the waveguide system may include a thermo-electric cooler to cool the polymer material to affect the index of refraction in the reverse manner to heating.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

Figure 1:
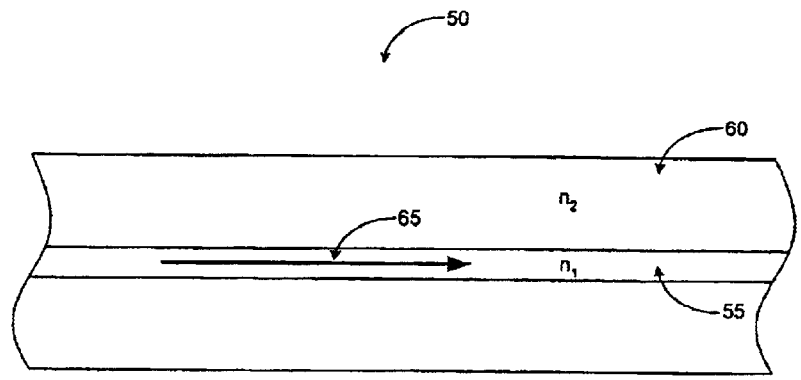
FIG. 1 is a drawing showing a conventional optical fiber waveguide.

Turning to FIG. 1, shown is a waveguide which comprises a conventional optical fiber 50. The optical fiber 50 comprises a core 55 surrounded by a cladding 60. The core 55 is comprised of a material such as, for example, doped silica with an index of refraction of $n_1$. The cladding 60 is comprised of a material such as, for example, silica with an index of refraction of $n_2$. The optical fiber 50 operates as a waveguide for light radiation 65 when $n_1$ is greater than $n_2$ as is known by those skilled in the art. When $n_1$ is less than or equal to $n_2$, the light radiation 65 leaves the core and will not propagate along the core 55.

Figure 2A:
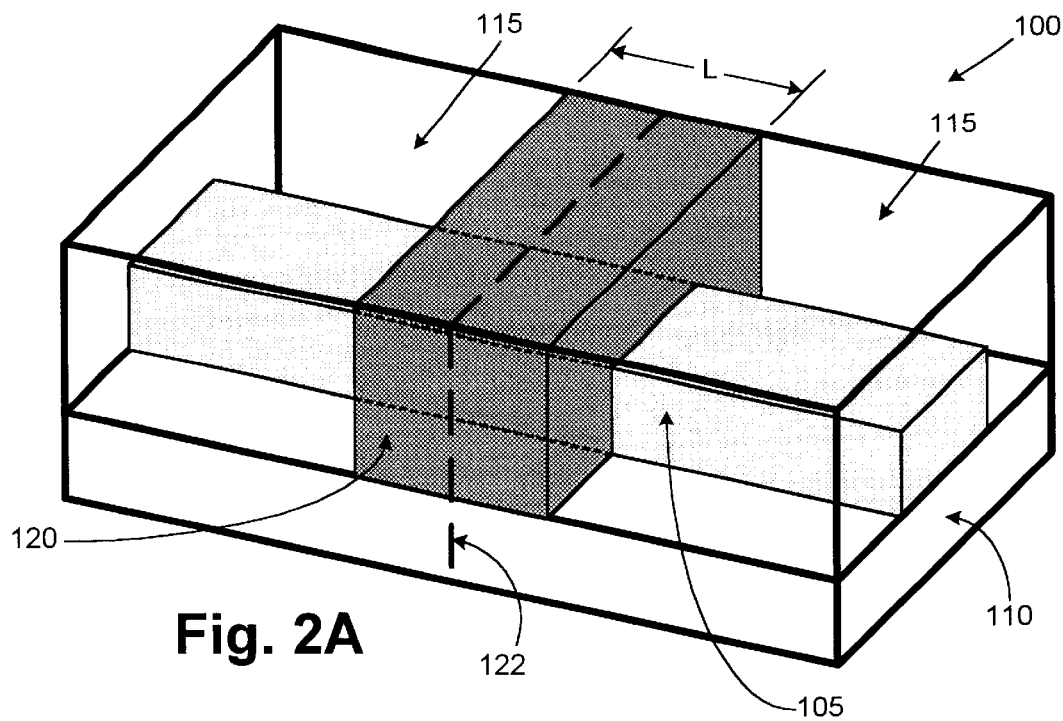
FIG. 2A is a drawing showing a first optical waveguide according to an embodiment of the present invention.
Figure 2B:
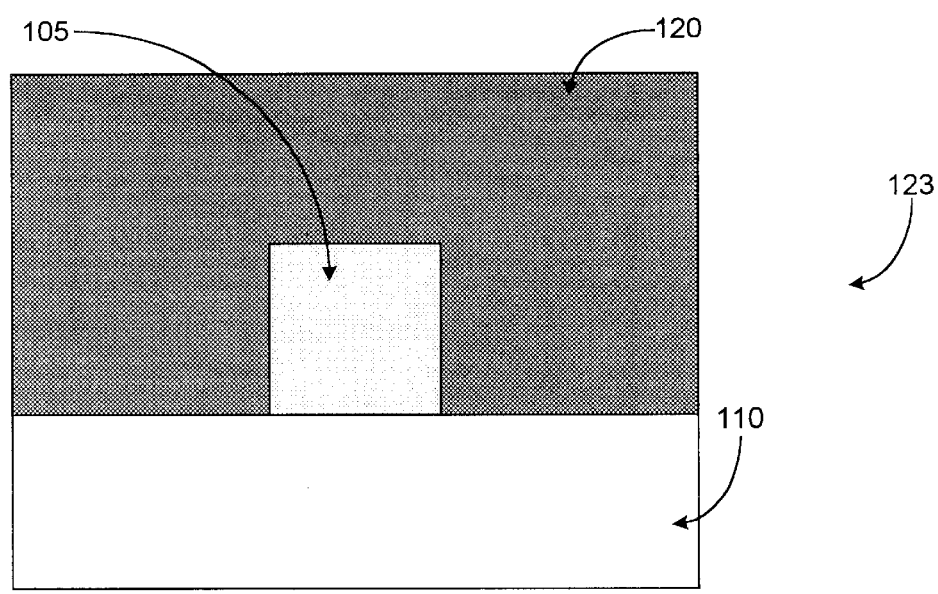
FIG. 2B is a drawing showing a sectional view of the optical waveguide of FIG. 2A.

With these concepts is mind, reference is made to FIGS. 2A and 2B which show a waveguide structure 100 according to an embodiment of the present invention. In FIG. 2A, the waveguide structure 100 includes a doped silica core 105 which is formed on a silica substrate 110. The doped silica core 105 is surrounded by a silica cladding material 115 which encloses the remaining sides of the core 105 not bounded by the silica substrate 110. In a section of identifiable length L, a polymer cladding material 120 encloses the remaining sides of the core 105 instead of the silica cladding material 115. The doped silica core 105 has an index of refraction of $n_1$, the silica substrate 110 has an index of refraction of $n_2$, the silica cladding material 115 has an index of refraction of $n_C$, and the polymer cladding material 120 has an index of refraction of $n_p$. A dashed line 122 indicates a cutting plane through the waveguide structure 100 at the polymer cladding material 120. In FIG. 2B, shown is a sectional view 123 of the waveguide structure 100 taken along the dashed line 122 which further illustrates the core 105, substrate 110, and the polymer cladding material 120. The polymer cladding material 120 is taken from the general category of materials classified as polymers which generally are chemical compounds with high molecular weight comprising a number of structural units linked together by covalent bonds. Polymers which qualify for use as the polymer cladding material 120 should generally possess the optical characteristics including an index of refraction that varies with temperature as will be discussed.

Although the core 105 comprises doped silica and the substrate 110 comprises silica, it is understood that other materials may be employed as known by those skilled in the art. Consequently, an exhaustive list of possible materials used to create these components is not offered herein.

It is understood that the waveguide structure 100 is for illustrative purposes and is not the only structural configuration possible. It may be possible for example, that the polymer cladding material 120 only contact the doped silica core 105 in specified regions such as on the upper surface of the doped silica core 105, for example. The design of the actual waveguide structure 100 is such that the polymer cladding material 120 comes into contact with the doped silica core 110 so that the propagation of light radiation through the core 110 can be manipulated by controlling the index of refraction of the polymer cladding material 120 relative to the index of refraction of the doped silica core 105 to achieve certain advantages.

The polymer cladding material 120 features a relatively high thermo-optic coefficient $$\frac{\partial n_P}{\partial T}$$

due to the fact that the index of refraction of polymers can vary significantly with changing temperature. For example, the thermo-optic coefficient $$\frac{\partial n_P}{\partial T}$$

generally may be as high as $-0.0001C^{-1}$ and even up to $-0.0003\ C^{-1}$, where $n_p$ is the refractive index of the polymer and T is temperature. In contrast, the thermo-optic coefficient of silica is much lower and of opposite polarity, being on the order of $+0.00001\ C^{-1}$. Consequently, the index of refraction of fused silica and other similar materials will not change significantly when subjected to heat, while the index of refraction of the polymer will change significantly. The polymer cladding material may have a thermal coefficient that is greater than the thermal coefficient of the core by a factor of at least 5.

Figure 3:
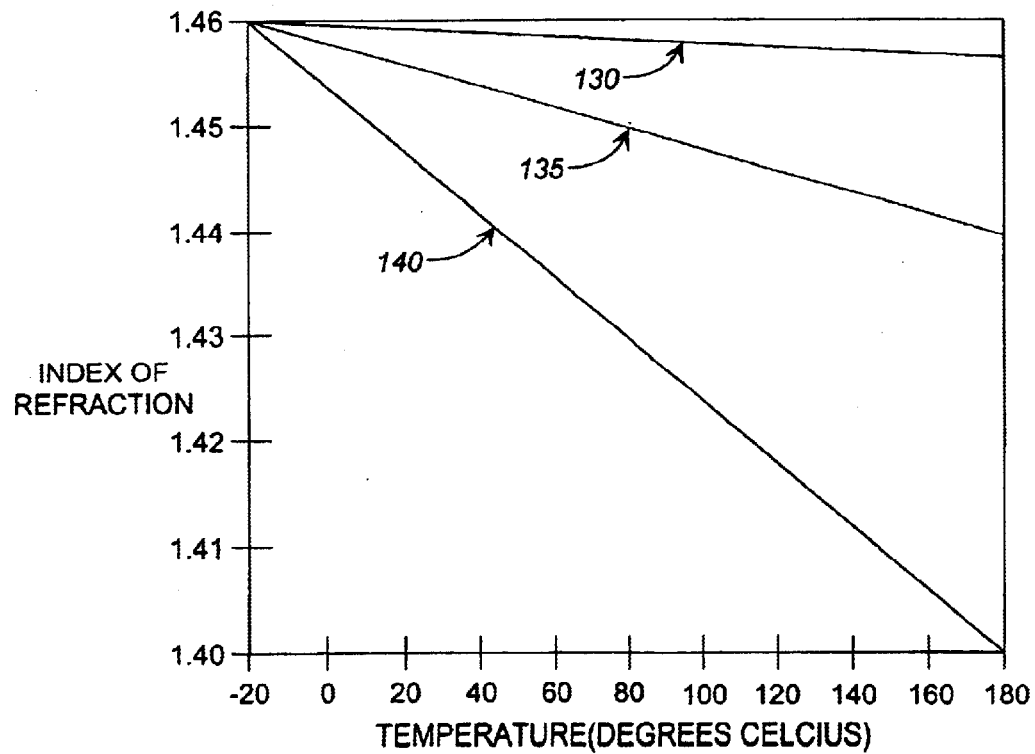
FIG. 3 is a chart of the indexes of refraction of example polymers as a function of temperature.

Referring to FIG. 3, shown is a graph depicting the index of refraction as a function of temperature in degrees Celsius of three example polymers which may be used according to the various embodiments of the present invention. Line 130 depicts the index of refraction of F/CA polymer which has a thermal coefficient of $-0.00002C^{-1}$, line 135 depicts the index of refraction of D-PMMA/D-FA polymer which has a thermal coefficient of $-0.000C^{-1}$, and line 140 depicts the index of refraction of FA polymer which has a thermal coefficient of $-0.0003C^{-1}$. Note that the starting point at n=1.46 and Temperature=$-20°$ C. were chosen arbitrarily. Ultimately, the indexes of refraction of various polymers depend upon their composition and can vary over a relatively wide range as a function of temperature.

The change of the index of refraction of a polymer cladding as contemplated herein provides distinct advantages. For example, a change in the propagation constant $\beta$ of the guided optical wave through the core can be made by changing the temperature of the polymer cladding. Also, the propagation of light radiation through the core may be diminished or stopped by raising the index of refraction of the polymer cladding above that of the core.

Figure 4A:
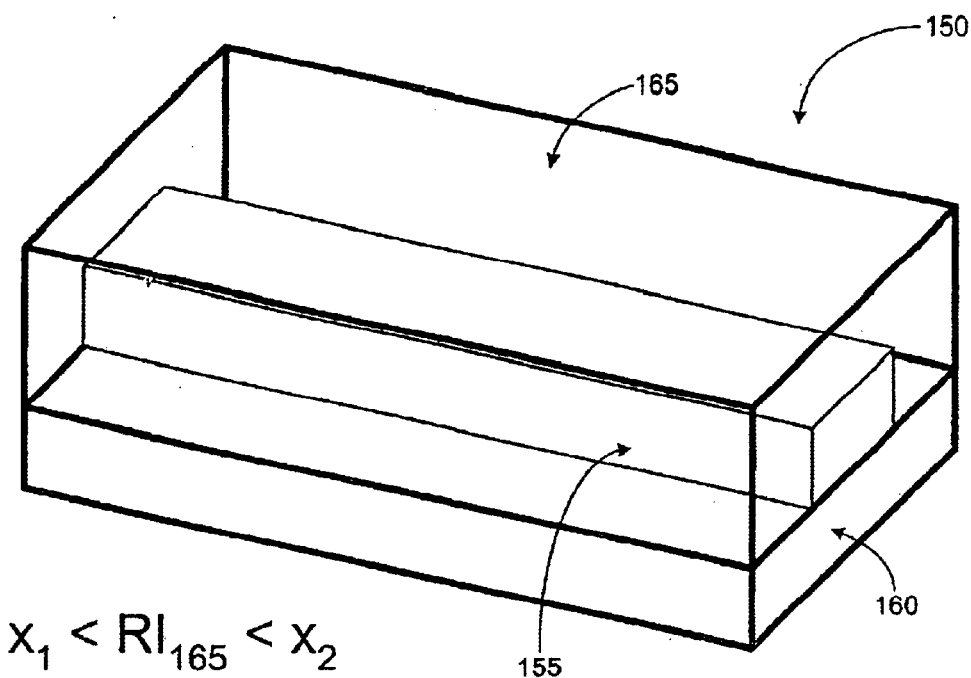
FIG. 4A is a drawing showing a second optical waveguide according to another embodiment of the present invention.
Figure 4B:
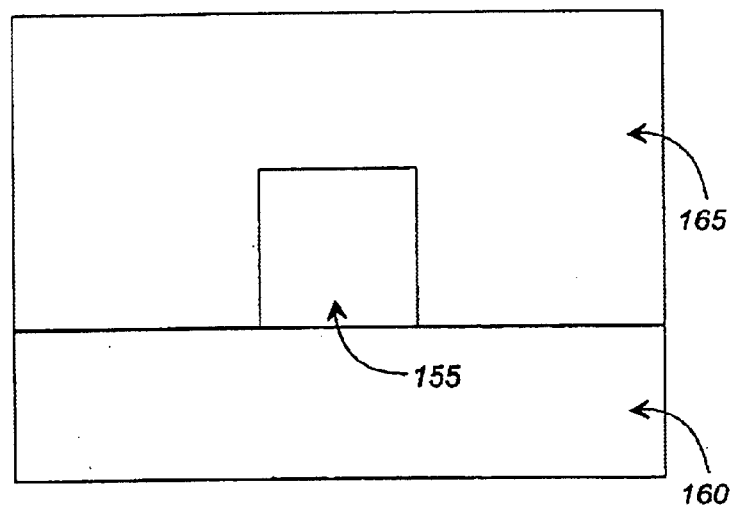
FIG. 4B is a drawing showing a sectional view of the second optical waveguide of FIG. 4A.

Turning next to FIG. 4A, shown is a second waveguide structure 150 according to another embodiment of the present invention. The waveguide structure 150 features a polymer core 155 formed on a substrate material 160 and surrounded on the remaining sides by a cladding material 165. The cladding material 165 may be another polymer or other material that has an index of refraction that allows the propagation of light through the polymer core 155. The relative indexes of refraction of the polymer core 155 and the cladding material 165 are manipulated to achieve the desired propagation through the waveguide structure 150. The wave guide may have a polymer cladding material that has an index of refraction ($RI_{165}$) that varies between a first value ($x_1$) that is greater than that of the index of refraction of the core ($RI_{155}$) and a second value ($x_2$) that is less than that of $RI_{155}$. FIG. 4B shows is a sectional view of the waveguide structure 150.

Figure 5:
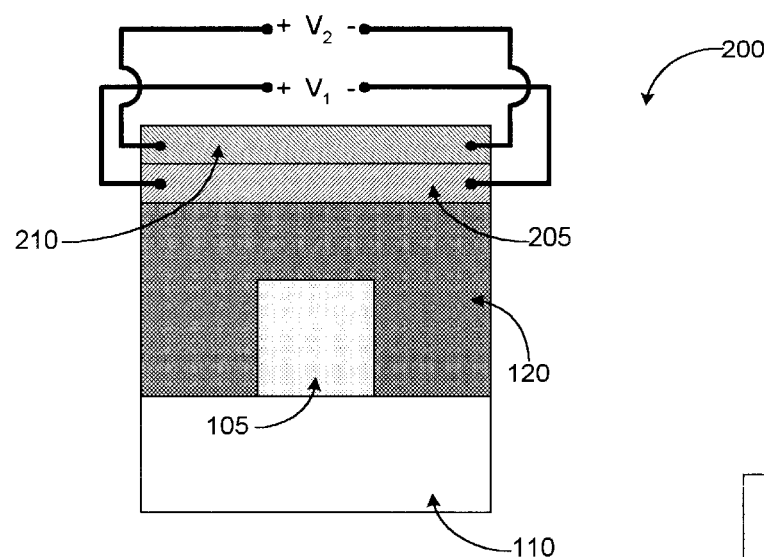
FIG. 5 is a drawing showing an optical waveguide system that employs a thermo-electric heater with the optical waveguide of FIG. 2A according to another embodiment of the present invention.

Referring to FIG. 5, shown is a waveguide system 200 according to another embodiment the present invention. The waveguide system 200 features the waveguide structure 100 (FIG. 2A) which includes the polymer cladding material 120 with the doped silica core 105 formed on the silica substrate 110. The waveguide system 200 further includes a thermo-electric heater 205 and a thermo-electric cooler 210. The thermo-electric heater 205 is electrically coupled to a voltage source $V_1$ and may be of the chrome strip type. Other types of thermo-electric heaters 205 may include electrically conducting glass materials. The thermo-electric cooler 210 is electrically coupled to a voltage source $V_2$. The waveguide system 200 may be constructed with the thermo-electric heater 205 alone or with the thermo-electric cooler 210 alone depending on the ambient temperature and the desired range for the index of refraction of the polymer material. The waveguide system 200 is formed, for example, on an integrated optical circuit which are well known by those skilled in the art and not discussed here in detail.

Figure 6:
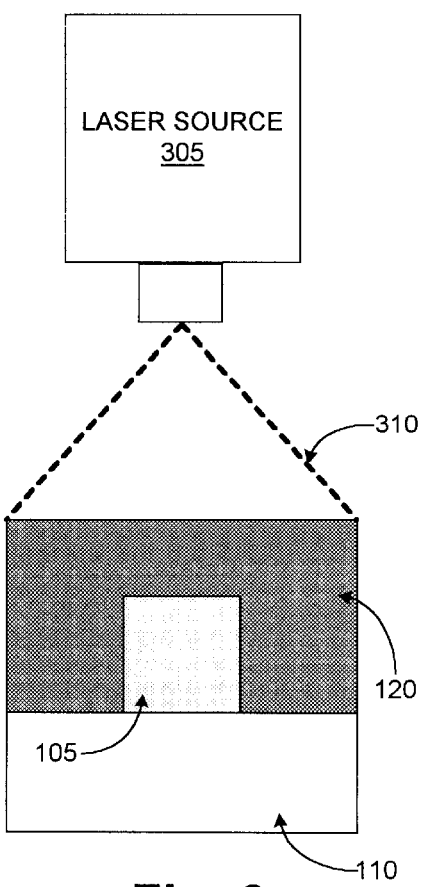
FIG. 6 is a drawing showing an optical waveguide system that employs a laser source with the optical waveguide of FIG. 2A according to yet another embodiment of the present invention.

Referring next, to FIG. 6, shown is a second waveguide system 300 according to yet another embodiment of the present invention. The waveguide system 300 also features the waveguide structure 100 (FIG. 2B) which includes the polymer cladding material 120 with the doped silica core 105 formed on the silica substrate 110. In addition, the waveguide system 300 includes a laser source 305 which produces laser radiation 310. The laser source 305 is directed such that the laser radiation 310 falls onto the polymer cladding material 120. The laser radiation 310 heats up the polymer cladding material 120 resulting in a corresponding change in the index of refraction of the polymer cladding material 120. Note that a thermo-electric cooler 210 (FIG. 5) may be included in the waveguide system 300 similar to the waveguide system 200.

Many variations and modifications may be made to the various embodiments of the invention without departing substantially from the spirit and principles of the invention. All such modifications and variations are intended to be included herein within the scope of the present invention, as defined by the following claims.

Having thus described the invention, it is claimed:

1. An optical light transmission device, comprising:
   a planar waveguide including
      a core having a first index of refraction, said first index of refraction varying in an insignificant amount upon application of heat; and
      a polymer cladding material in contact with the core, said cladding material having a second index of refraction which varies upon the application of heat, such that when a temperature change is applied to the polymer cladding material, the second index of refraction of the polymer cladding material changes, while the first index of refraction of the core remains approximately the same, whereby propagation of light is manipulated between the polymer cladding material and the core based on the change in temperature.

2. The waveguide of claim 1, wherein a second thermal coefficient of the polymer cladding material is greater than a first thermal coefficient of the core by a factor of at least 5.

3. The waveguide of claim 2, further comprising an electrical heating element coupled to the polymer cladding material.

4. The waveguide of claim 2, further comprising a source of laser radiation positioned to direct laser radiation at the polymer cladding material.

5. The waveguide of claim 1, wherein said second index of refraction varies between a first value that is greater than that of the first index of refraction and a second value that is less than that of the first index of refraction.

6. The waveguide of claim 1, further comprising an electrical heating element coupled to the polymer cladding material.

7. The waveguide of claim 1, further comprising a source of laser radiation positioned to direct laser radiation at the polymer cladding material.

8. The waveguide of claim 1, further comprising a thermo-electric cooler coupled to the polymer cladding material.

9. An optical light transmission device, comprising:

a planar waveguide including a polymer core having a first index of refraction, said first index of refraction varying upon application of heat; and a cladding material in contact with the core, said cladding material having a second index of refraction which varies in an insignificant amount upon the application of heat, such that when a temperature change is applied to the polymer core, the first index of refraction of the polymer core changes, while the second index of refraction of the cladding material remains approximately the same, whereby propagation of light is manipulated based on the change in temperature.

* * * * *